(12) United States Patent
Stoenescu et al.

(10) Patent No.: US 12,295,398 B2
(45) Date of Patent: May 13, 2025

(54) DEVICE AND METHOD FOR NUCLEATION OF A SUPERCOOLED BEVERAGE USING AN ULTRASONIC TRANSDUCER

(71) Applicant: PepsiCo, Inc., Purchase, NY (US)

(72) Inventors: Eleonor Dorin Stoenescu, Stamford, CT (US); Emad Jafa, Brewster, NY (US); Samuel Luke Johnstone, Great Shelford (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 18/396,478

(22) Filed: Dec. 26, 2023

(65) Prior Publication Data

US 2024/0138450 A1    May 2, 2024

Related U.S. Application Data

(62) Division of application No. 16/700,367, filed on Dec. 2, 2019, now Pat. No. 11,910,815.

(51) Int. Cl.
*A23L 5/30*    (2016.01)
*A23G 9/04*    (2006.01)
(Continued)

(52) U.S. Cl.
CPC ............... *A23L 5/32* (2016.08); *A23G 9/045* (2013.01); *A23G 9/224* (2013.01); *B01F 31/202* (2022.01);
(Continued)

(58) Field of Classification Search
CPC .. A23L 5/32; A23L 2/00; A23G 9/045; A23G 9/224; B01F 31/202; B01F 31/28;
(Continued)

(56) References Cited

U.S. PATENT DOCUMENTS 1,023,116 A * 4/1912 Bailey .................. F25D 31/007
  221/312 R
2,250,557 A * 7/1941 Tull ....................... F25D 17/06
  62/380
(Continued)

FOREIGN PATENT DOCUMENTS

AR           27183 A1    3/2003
AU      1999039425 A    2/2000
(Continued)

OTHER PUBLICATIONS

International Search Report and Written Opinion in International Application No. PCT/US2021/017435, mailed Apr. 27, 2021 (11 pages).
(Continued)

*Primary Examiner* — Charles Cooley
(74) *Attorney, Agent, or Firm* — Sterne, Kessler, Goldstein & Fox P.L.L.C.

(57) ABSTRACT

A beverage nucleation device includes a housing, a beverage receiving area defined by the housing for receiving a beverage container containing a supercooled beverage, and a support configured to support the beverage container in an upright orientation in the beverage container receiving area. The beverage nucleation device may further include an applicator configured to contact a sidewall of the beverage container on the support, wherein the applicator includes an elastomeric material. An ultrasonic transducer of the beverage nucleation device is configured to generate and apply ultrasonic energy to the beverage container via the applicator so as to cause nucleation of the supercooled beverage.

20 Claims, 13 Drawing Sheets

(51) Int. Cl.
*A23G 9/22* (2006.01)
*B01F 31/20* (2022.01)
*B01F 31/80* (2022.01)
*B01F 31/86* (2022.01)
*B01F 101/14* (2022.01)

(52) U.S. Cl.
CPC .............. *B01F 31/28* (2022.01); *B01F 31/86* (2022.01); *B01F 31/89* (2022.01); *A23V 2002/00* (2013.01); *B01F 2101/14* (2022.01)

(58) Field of Classification Search
CPC ........ B01F 23/709; B01F 31/86; B01F 31/89; B01F 2101/14; A23V 2002/00
USPC ........................................................ 366/127
See application file for complete search history.

(56) References Cited

U.S. PATENT DOCUMENTS

| | | | | |
|---|---|---|---|---|
| 2,260,643 A * | 10/1941 | Rosan | .................. | G07F 7/0609 221/6 |
| 2,266,025 A * | 12/1941 | Grau | ...................... | G07F 11/52 221/152 |
| 2,371,845 A * | 3/1945 | Robison | .................. | G07F 11/04 221/250 |
| 2,496,304 A * | 2/1950 | Muffly | .................... | F25D 17/02 62/331 |
| 2,671,001 A * | 3/1954 | Ossanna, Jr. | ......... | A47F 3/0408 62/250 |
| 2,711,241 A * | 6/1955 | Abrahamsen | .......... | F25D 25/00 221/256 |
| 2,736,174 A * | 2/1956 | Tice | ..................... | F25D 31/007 62/381 |
| 2,935,225 A * | 5/1960 | Prentiss | ................. | G07F 11/54 221/277 |
| 2,956,660 A * | 10/1960 | Nordquist | .............. | G07F 11/34 221/9 |
| 3,021,120 A * | 2/1962 | Van Der Burgt | ......... | B06B 1/08 366/127 |
| 3,055,548 A * | 9/1962 | Allegri | ...................... | A47F 1/10 221/281 |
| 3,198,489 A * | 8/1965 | Finch | .................... | B06B 1/0618 366/115 |
| 3,231,323 A * | 1/1966 | Wells | ........................ | A47F 7/28 312/211 |
| 3,359,748 A * | 12/1967 | Booth | .................... | A23G 9/228 62/70 |
| 3,410,452 A * | 11/1968 | Wolfgang | ............ | B65G 47/256 221/13 |
| 3,460,593 A * | 8/1969 | Kuckens | ................. | A47F 1/106 141/174 |
| 3,480,258 A * | 11/1969 | Massa | ...................... | B08B 3/12 366/115 |
| 3,561,640 A * | 2/1971 | Thompson | ............... | G07F 11/04 221/108 |
| 4,248,358 A * | 2/1981 | Muench | .................. | G07F 11/04 221/150 A |
| 4,287,992 A * | 9/1981 | Takemori | ................ | A47F 1/087 312/45 |
| 4,411,351 A * | 10/1983 | Lowder | .................. | G07F 7/0609 194/212 |
| 4,687,119 A * | 8/1987 | Juillet | .................. | G07F 17/0078 221/124 |
| 4,691,725 A * | 9/1987 | Parisi | ................. | G02C 13/008 366/127 |
| 4,699,295 A * | 10/1987 | Cedrone | ................ | G07F 11/10 221/131 |
| 4,823,984 A * | 4/1989 | Ficken | .................. | G07F 11/24 221/195 |
| 4,920,763 A * | 5/1990 | Provest | .................. | F25D 17/02 62/378 |
| 4,930,532 A * | 6/1990 | Mayer | .................... | A61C 19/002 366/127 |
| 5,009,329 A * | 4/1991 | Farrentine | ............... | G07F 11/34 221/175 |
| 5,176,446 A * | 1/1993 | Chiba | ..................... | B01F 31/86 366/114 |
| 5,201,191 A * | 4/1993 | Bustos | .................. | A47F 3/0408 211/187 |
| 5,237,835 A * | 8/1993 | Brochier | .................. | F25D 17/02 62/336 |
| 5,247,798 A * | 9/1993 | Collard, Jr. | ............. | F25B 21/02 221/281 |
| 5,248,102 A * | 9/1993 | Bohn | .................. | B02C 19/0087 241/DIG. 38 |
| 5,303,214 A * | 4/1994 | Kulakowski | .......... | G11B 17/225 |
| 5,335,818 A * | 8/1994 | Maldanis | ................ | G07F 11/24 49/94 |
| 5,499,707 A * | 3/1996 | Steury | ........................ | G07F 9/02 414/280 |
| 5,671,604 A * | 9/1997 | Rudick | .................... | F25D 3/105 62/52.1 |
| 5,689,967 A * | 11/1997 | Fløysvik | ................ | F25D 31/007 62/275 |
| RE35,743 E * | 3/1998 | Pearson | .................. | G07F 9/002 221/9 |
| 5,890,622 A * | 4/1999 | Farmont | ................ | G07F 17/145 194/902 |
| 5,927,851 A * | 7/1999 | Carlson | .................... | B01F 31/86 366/110 |
| 5,960,988 A * | 10/1999 | Freixas | ...................... | A47F 1/04 221/13 |
| 5,988,428 A * | 11/1999 | Lauer | ...................... | G07F 11/16 221/266 |
| 6,059,145 A * | 5/2000 | Stratton | ............... | B67D 1/0875 40/406 |
| 6,073,460 A * | 6/2000 | Credle, Jr. | ................. | A47F 3/11 62/250 |
| 6,085,534 A * | 7/2000 | Anthony | .................. | G07F 11/38 221/150 R |
| 6,158,227 A * | 12/2000 | Seeley | ...................... | G01K 1/14 374/E1.018 |
| 6,173,582 B1 * | 1/2001 | Hixson | .................... | F25D 25/00 62/457.4 |
| RE37,213 E * | 6/2001 | Staggs | .................... | F25D 31/007 62/530 |
| 6,273,292 B1 * | 8/2001 | Milan | ...................... | G07F 9/105 221/150 R |
| 6,389,822 B1 * | 5/2002 | Schanin | .................. | G07F 9/105 236/47 |
| 6,390,328 B1 * | 5/2002 | Obermeier | .............. | G07F 11/24 221/266 |
| 6,511,693 B2 * | 1/2003 | Jones | ..................... | A23G 9/305 426/399 |
| 6,598,789 B1 * | 7/2003 | Matsumoto | .......... | G03F 7/70741 235/383 |
| 6,609,391 B2 * | 8/2003 | Davis | .................... | B67D 1/0012 62/396 |
| 6,644,327 B1 * | 11/2003 | Mitsumori | ................ | B08B 3/12 366/115 |
| 6,862,896 B1 * | 3/2005 | Seidl | ........................ | F25D 3/08 220/592.16 |
| 6,968,975 B2 * | 11/2005 | Christensen | ............. | B65G 1/08 221/298 |
| 7,100,796 B1 * | 9/2006 | Orr | ............................ | G07F 9/10 141/369 |
| 7,150,155 B2 * | 12/2006 | Faber | ...................... | G07F 11/14 62/381 |
| 7,377,123 B2 * | 5/2008 | Byrne | ........................ | G07F 9/10 221/256 |
| 7,497,352 B2 * | 3/2009 | Segiet | ...................... | G07F 9/105 221/220 |
| 7,559,482 B2 * | 7/2009 | Coveley | .................. | G07F 9/026 340/572.1 |
| 7,596,964 B2 * | 10/2009 | Lim | ...................... | F25D 23/126 222/146.6 |
| 7,621,139 B2 | 11/2009 | Ha et al. | | |
| 7,824,725 B2 * | 11/2010 | Pfister | .................... | A23L 3/364 426/590 |

(56) References Cited

U.S. PATENT DOCUMENTS

| | | | | |
|---|---|---|---|---|
| 8,028,855 B2* | 10/2011 | White | | G07F 11/10 221/312 R |
| 8,132,960 B2* | 3/2012 | Zhuang | | B01F 31/201 366/209 |
| 8,151,577 B2* | 4/2012 | Bucceri | | A23L 2/38 62/529 |
| 8,151,598 B2* | 4/2012 | Wittern, Jr. | | G07F 9/105 62/440 |
| 8,161,756 B2* | 4/2012 | Kutta | | F25D 31/007 62/63 |
| 8,360,272 B2 | 1/2013 | Piersant et al. | | |
| 8,433,440 B2* | 4/2013 | Felique | | G11B 19/027 700/231 |
| 8,442,674 B2* | 5/2013 | Tilton | | A47J 31/4403 700/239 |
| 8,464,544 B2* | 6/2013 | Shin | | F25D 11/02 62/157 |
| 8,863,649 B1* | 10/2014 | Rao | | A47J 31/00 700/15 |
| 8,899,280 B2* | 12/2014 | Deo | | B67D 1/0888 222/23 |
| 9,280,271 B2* | 3/2016 | Hoog | | A47J 31/525 |
| 9,475,685 B2* | 10/2016 | Davenport | | B67D 1/0872 |
| 9,514,595 B2* | 12/2016 | Agon | | G07F 17/16 |
| 9,754,438 B2* | 9/2017 | Chang | | G07F 11/44 |
| 10,393,427 B2 | 8/2019 | Shuntich | | |
| 10,451,330 B2 | 10/2019 | Yanagisawa et al. | | |
| 11,103,091 B2 | 8/2021 | Roekens | | |
| 11,311,026 B2* | 4/2022 | Fonte | | A23G 9/22 |
| 11,910,815 B2* | 2/2024 | Stoenescu | | A23L 2/00 |
| 12,185,737 B2* | 1/2025 | Hawkins | | A23L 2/54 |
| 2002/0005043 A1* | 1/2002 | Rudick | | F25D 31/007 62/6 |
| 2002/0124576 A1* | 9/2002 | Loibl | | F28D 3/00 62/381 |
| 2003/0218023 A1* | 11/2003 | Zangari | | G07F 11/34 221/150 R |
| 2004/0026446 A1* | 2/2004 | Mori | | G07F 11/14 221/281 |
| 2005/0045244 A1 | 3/2005 | Hartness et al. | | |
| 2005/0056047 A1* | 3/2005 | Carmichael | | F25D 25/00 62/465 |
| 2005/0234590 A1* | 10/2005 | Sato | | G06Q 20/20 705/16 |
| 2007/0012066 A1* | 1/2007 | Kaplan | | F25D 3/08 62/530 |
| 2007/0106422 A1* | 5/2007 | Jennings | | B25J 9/0084 222/129.1 |
| 2007/0163275 A1* | 7/2007 | Ha | | F25D 29/00 62/340 |
| 2007/0163289 A1* | 7/2007 | Hahm | | F25D 31/007 62/414 |
| 2008/0011765 A1* | 1/2008 | Marquez | | G07F 11/16 221/12 |
| 2008/0066506 A1* | 3/2008 | Carbajal | | E05B 47/0002 70/267 |
| 2008/0245079 A1* | 10/2008 | Lim | | F25D 23/12 62/426 |
| 2008/0245081 A1* | 10/2008 | Shin | | F25D 23/12 700/275 |
| 2008/0245820 A1* | 10/2008 | Pfister | | G07F 11/24 221/124 |
| 2009/0000312 A1* | 1/2009 | Smith | | F25D 31/006 62/515 |
| 2009/0029016 A1* | 1/2009 | Pfister | | F25D 17/065 99/485 |
| 2009/0076650 A1* | 3/2009 | Faes | | G07F 11/42 700/231 |
| 2009/0179042 A1* | 7/2009 | Milan | | G07F 9/105 62/235.1 |
| 2009/0236954 A1* | 9/2009 | Kobayashi | | A47F 3/0404 312/236 |
| 2010/0008178 A1* | 1/2010 | Fahrion | | B01F 31/86 366/127 |
| 2010/0058776 A1* | 3/2010 | Loibl | | F25D 31/007 62/264 |
| 2010/0242497 A1* | 9/2010 | Bertone | | B67D 1/1236 62/344 |
| 2010/0294618 A1* | 11/2010 | Jennison | | F25C 5/20 340/815.4 |
| 2010/0319363 A1* | 12/2010 | Dieckmann | | F25D 31/007 165/84 |
| 2011/0006074 A1* | 1/2011 | Machers | | G07F 11/34 221/282 |
| 2011/0186591 A1* | 8/2011 | Pfister | | F25D 31/007 221/97 |
| 2011/0239675 A1* | 10/2011 | Roekens | | A47F 3/0404 62/252 |
| 2012/0173016 A1* | 7/2012 | Piersant | | G07F 7/0609 312/211 |
| 2012/0277904 A1* | 11/2012 | Pritchard | | G07F 11/165 221/154 |
| 2013/0087050 A1* | 4/2013 | Studor | | A47J 31/525 99/279 |
| 2013/0126042 A1* | 5/2013 | Dewald | | G07F 11/44 141/105 |
| 2013/0233914 A1* | 9/2013 | Lillard, Jr. | | B65D 1/265 235/375 |
| 2014/0263415 A1* | 9/2014 | San Miguel | | A23G 9/283 222/1 |
| 2014/0312053 A1* | 10/2014 | Yamagami | | G07F 9/105 221/150 R |
| 2015/0206373 A1* | 7/2015 | Kim | | G07F 11/58 221/150 R |
| 2015/0245636 A1* | 9/2015 | Forrester, Jr. | | A23G 9/22 366/228 |
| 2015/0264968 A1* | 9/2015 | Shuntich | | A23L 5/32 99/275 |
| 2015/0322694 A1* | 11/2015 | Carr | | G07C 9/00944 70/277 |
| 2016/0187239 A1* | 6/2016 | Givens | | B01F 35/22161 436/180 |
| 2017/0122645 A1* | 5/2017 | Berardino | | B65D 81/18 |
| 2017/0241693 A1* | 8/2017 | Tajika | | F25B 47/022 |
| 2017/0254584 A1* | 9/2017 | Denison | | F25D 23/028 |
| 2018/0045458 A1* | 2/2018 | Shuntich | | F25D 3/08 |
| 2018/0120023 A1 | 5/2018 | Shuntich | | |
| 2018/0135911 A1* | 5/2018 | Barnes | | F25D 3/10 |
| 2018/0147609 A1* | 5/2018 | Miya | | H01L 21/02 |
| 2018/0149422 A1* | 5/2018 | Spivey | | F25D 31/007 |
| 2018/0164033 A1* | 6/2018 | Lee | | F25D 29/005 |
| 2018/0177310 A1* | 6/2018 | Roekens | | A47F 3/0486 |
| 2018/0180353 A1* | 6/2018 | Shuntich | | F25D 31/007 |
| 2018/0268640 A1* | 9/2018 | Tadika | | G07F 9/105 |
| 2018/0274842 A1* | 9/2018 | Yanagisawa | | F25D 17/08 |
| 2018/0310589 A1* | 11/2018 | Sosa | | F25D 31/007 |
| 2018/0319581 A1* | 11/2018 | Heintz | | B65D 23/12 |
| 2019/0000108 A1 | 1/2019 | Shuntich | | |
| 2019/0042015 A1* | 2/2019 | Lee | | A47J 3/001 |
| 2019/0256337 A1* | 8/2019 | Bhutani | | B67D 1/0057 |
| 2019/0308147 A1 | 10/2019 | Birkner et al. | | |
| 2020/0008448 A1* | 1/2020 | Sekita | | A23L 2/00 |
| 2020/0107559 A1* | 4/2020 | Deshpande | | A23G 9/224 |
| 2020/0121096 A1 | 4/2020 | Roekens | | |
| 2020/0149804 A1* | 5/2020 | Pell | | F25D 31/003 |
| 2020/0312078 A1* | 10/2020 | Deshpande | | G07F 13/10 |
| 2020/0315373 A1* | 10/2020 | Deshpande | | G07F 17/0071 |
| 2021/0074113 A1* | 3/2021 | Uehata | | G07F 7/02 |
| 2021/0161182 A1* | 6/2021 | Stoenescu | | A23G 9/224 |
| 2022/0192236 A1* | 6/2022 | Sekita | | A23L 5/32 |
| 2024/0138450 A1* | 5/2024 | Stoenescu | | B01F 31/28 |

FOREIGN PATENT DOCUMENTS

| | | |
|---|---|---|
| AU | 2011236097 A1 | 11/2011 |
| AU | 2014367824 B2 | 4/2018 |
| BR | PI0919723 A2 | 8/2015 |
| CA | 2332291 C | 4/2012 |
| CA | 2719220 C | 6/2016 |

(56) References Cited

FOREIGN PATENT DOCUMENTS

| | | | |
|---|---|---|---|
| CN | 102506538 | A | 6/2012 |
| CN | 103075867 | B | 7/2015 |
| CN | 103403479 | B | 11/2015 |
| CN | 103459950 | B | 11/2015 |
| CN | 106796074 | A | 5/2017 |
| CN | 103575014 | B | 10/2017 |
| CN | 109377660 | A | 2/2019 |
| CN | 110225705 | A | 9/2019 |
| DE | 2938198 | A1 | 4/1981 |
| EP | 1234798 | A1 | 8/2002 |
| EP | 966220 | B1 | 10/2003 |
| EP | 1821053 | A1 | 8/2007 |
| EP | 1813894 | A3 | 12/2009 |
| EP | 1808658 | A3 | 12/2013 |
| EP | 1808659 | A3 | 12/2013 |
| ES | 2517042 | R1 | 11/2014 |
| GB | 2369611 | A | 6/2002 |
| GB | 2448299 | A | 10/2008 |
| GB | 2476834 | A | 7/2011 |
| GB | 2560792 | A | 9/2018 |
| IN | 201637041530 | A | 5/2017 |
| JP | 10340380 | A | 12/1998 |
| JP | 2001046029 | A | 2/2001 |
| JP | 2003214753 | A | 7/2003 |
| JP | 2005156042 | A | 6/2005 |
| JP | 2005318869 | A | 11/2005 |
| JP | 2008011835 | A | 1/2008 |
| JP | 2008145059 | A | 6/2008 |
| JP | 2008281227 | A | 11/2008 |
| JP | 2008292108 | A | 12/2008 |
| JP | 2009008331 | A | 1/2009 |
| JP | 2009019791 | A | 1/2009 |
| JP | 03154863 | U | 10/2009 |
| JP | 05006908 | B2 | 8/2012 |
| JP | 2016122388 | A | 7/2016 |
| JP | 2016202045 | A | 12/2016 |
| JP | 2017-531151 | A | 10/2017 |
| KR | 2008-088944 | A | 10/2008 |
| KR | 2008-088945 | A | 10/2008 |
| KR | 1176455 | B1 | 8/2012 |
| KR | 1205822 | B1 | 11/2012 |
| KR | 2013-040711 | A | 4/2013 |
| KR | 2014-147315 | A | 12/2014 |
| KR | 1502472 | B1 | 3/2015 |
| KR | 2015-043103 | A | 4/2015 |
| KR | 2016-012411 | A | 2/2016 |
| KR | 1674634 | B1 | 11/2016 |
| KR | 1933588 | B1 | 12/2018 |
| MX | 2006005367 | A | 3/2007 |
| WO | WO 99/60092 | A1 | 11/1999 |
| WO | WO 99060091 | A1 | 11/1999 |
| WO | WO 2005087015 | A1 | 9/2005 |
| WO | WO 2006063401 | A1 | 6/2006 |
| WO | WO 2018102611 | A1 | 6/2018 |
| WO | WO 2018160594 | A1 | 9/2018 |

OTHER PUBLICATIONS

International Search Report and Written Opinion of the International Searching Authority in International Application No. PCT/US2019/054946, mailed Dec. 13, 2019 (11 pages).
International Search Report and Written Opinion of the International Searching Authority in International Application No. PCT/US2020/025983, mailed Jun. 30, 2020 (8 pages).
International Search Report and Written Opinion of the International Searching Authority in International Application No. PCT/US2020/061830, mailed Feb. 25, 2021 (8 pages).
International Search Report and Written Opinion of the International Searching Authority in International Application No. PCT/US2020/22982, mailed Jul. 28, 2020 (10 pages).
Extended European Search Report in European Patent Application No. 20895032.9, mailed Dec. 13, 2023 (9 pages).

* cited by examiner

DEVICE AND METHOD FOR NUCLEATION OF A SUPERCOOLED BEVERAGE USING AN ULTRASONIC TRANSDUCER

CROSS-REFERENCE TO RELATED APPLICATION

The present application is a divisional application of U.S. application Ser. No. 16/700,367, filed Dec. 2, 2019, which is incorporated herein by reference in its entirety.

FIELD

Embodiments described herein generally relate to devices and methods for forming a slush beverage. Specifically, embodiments described herein relate to devices and methods for causing nucleation of a supercooled beverage in a beverage container using ultrasonic energy to form a slush beverage within the beverage container.

BACKGROUND

Consumers may choose to purchase a packaged beverage, such as a bottled or canned beverage, rather than a fountain or draft beverage for a variety of reasons. Packaged beverages provide improved portability relative to fountain or draft beverages which are often dispensed into cups, as the packaged beverage, may be sealed and resealed and may be stored in a bag, lunchbox, or the like. Additionally, some consumers may prefer the experience of drinking directly from a can or bottle rather than drinking from a plastic or paper cup.

Packaged beverages, however, are typically limited to liquid beverages, and packaged beverages generally do not contain slush beverages. Slush beverages can be desirable where the consumer wishes to enjoy a cool and refreshing beverage with a unique texture. Additionally, a slush beverage may remain cool for a longer period of time than a beverage that has simply been refrigerated. As the slush beverage is partially frozen, the slush beverage is not diluted when the frozen portion of the slush beverage melts. Thus, there is a need in the art for devices and methods for preparing a slush beverage within a beverage container.

BRIEF SUMMARY OF THE INVENTION

Some embodiments described herein relate to a beverage nucleation device that may include a housing, a beverage receiving area defined by the housing for receiving a beverage container containing a supercooled beverage, a support configured to support the beverage container in an upright orientation in the beverage container receiving area. The beverage nucleation device may further include and an applicator configured to contact a sidewall of the beverage container on the support, wherein the applicator of the beverage nucleation device includes an elastomeric material, and an ultrasonic transducer configured to generate and apply ultrasonic energy to the beverage container via the applicator so as to cause nucleation of the supercooled beverage.

In any of the various embodiments discussed herein, the beverage nucleation device may further include an actuator configured to cause the ultrasonic transducer to apply the ultrasonic energy to the beverage container when the actuator is actuated.

In any of the various embodiments discussed herein, the beverage nucleation device may further include an indicator configured to visually indicate when nucleation of the supercooled beverage is complete.

In any of the various embodiments discussed herein, the beverage nucleation device may further include a beverage container holder configured to retain the beverage container in a static position during application of the ultrasonic energy. In some embodiments, the beverage container holder may include a first arm configured to be placed in contact with a first sidewall of the beverage container, and a second arm configured to be placed in contact with a second sidewall of the beverage container opposite the first sidewall. In some embodiments, the beverage nucleation device may further include a drive mechanism configured to move the first arm and the second arm from a resting position into an operational position in which the first arm and the second arm contact the beverage container. In some embodiments, the applicator may be configured to contact a third sidewall of the beverage container.

In any of the various embodiments discussed herein, the applicator may have a contact surface with an area of 0.5 $in^2$ to 9 $in^2$.

Some embodiments described herein relate to a beverage nucleation device that includes a housing, a beverage container receiving area defined by the housing for receiving a beverage container containing a supercooled beverage, and a support configured to support the beverage container in an upright orientation. The beverage nucleation device may further include an applicator enclosed by the housing and configured to contact a sidewall of the beverage container, wherein the applicator is configured to be selectively moved into contact with the beverage container. The beverage nucleation device may further include an ultrasonic transducer configured to selectively apply the ultrasonic energy to the beverage container via the applicator so as to cause nucleation of the supercooled beverage, a beverage container holder configured to move from a resting position to an operational position in which the beverage container holder is in contact with a sidewall of the beverage container, a drive mechanism configured to move the beverage container holder from the resting position to the operational position, and a control unit configured to control operation of the drive mechanism and the ultrasonic transducer.

In any of the various embodiments discussed herein, the applicator may include an elastomeric material.

In any of the various embodiments discussed herein, the drive mechanism may be configured to move the applicator from a resting position to an operational position in which the applicator is in contact with a sidewall of the beverage container.

In any of the various embodiments discussed herein, the beverage nucleation device may further include one or more movable gates configured to retain the beverage container on the support.

Some embodiments described herein relate to a method for nucleating a supercooled beverage in a beverage container using a beverage nucleation device, wherein the method includes securing the beverage container containing the supercooled beverage in the beverage nucleation device, contacting the secured beverage container with an applicator of the beverage nucleation device, wherein the applicator comprises an elastomeric material, and applying ultrasonic energy to the beverage container via the applicator so as to cause nucleation of the supercooled beverage within the beverage container.

In any of the various embodiments discussed herein, securing the beverage container may include moving a first arm into contact with a first sidewall of the beverage container and moving a second arm into contact with a second sidewall of the beverage container opposite the first sidewall.

In any of the various embodiments discussed herein, securing the beverage container may include securing the beverage container in an upright orientation.

In any of the various embodiments discussed herein, contacting the secured beverage container with an applicator may include placing a contact surface of the applicator in facing engagement with a sidewall of the secured beverage container.

In any of the various embodiments discussed herein, a method for nucleating a supercooled beverage may further include generating the ultrasonic energy via an ultrasonic transducer of the beverage nucleation device.

In any of the various embodiments discussed herein, a method for nucleating a supercooled beverage may further include applying the ultrasonic energy for a predetermined period of time.

In any of the various embodiments discussed herein, a method for nucleating a supercooled beverage may further include indicating completion of nucleation of the supercooled beverage via an indicator of the beverage nucleation device.

In any of the various embodiments discussed herein, a method for nucleating a supercooled beverage may include applying ultrasonic energy having a frequency of 1 kHz to 100 kHz.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
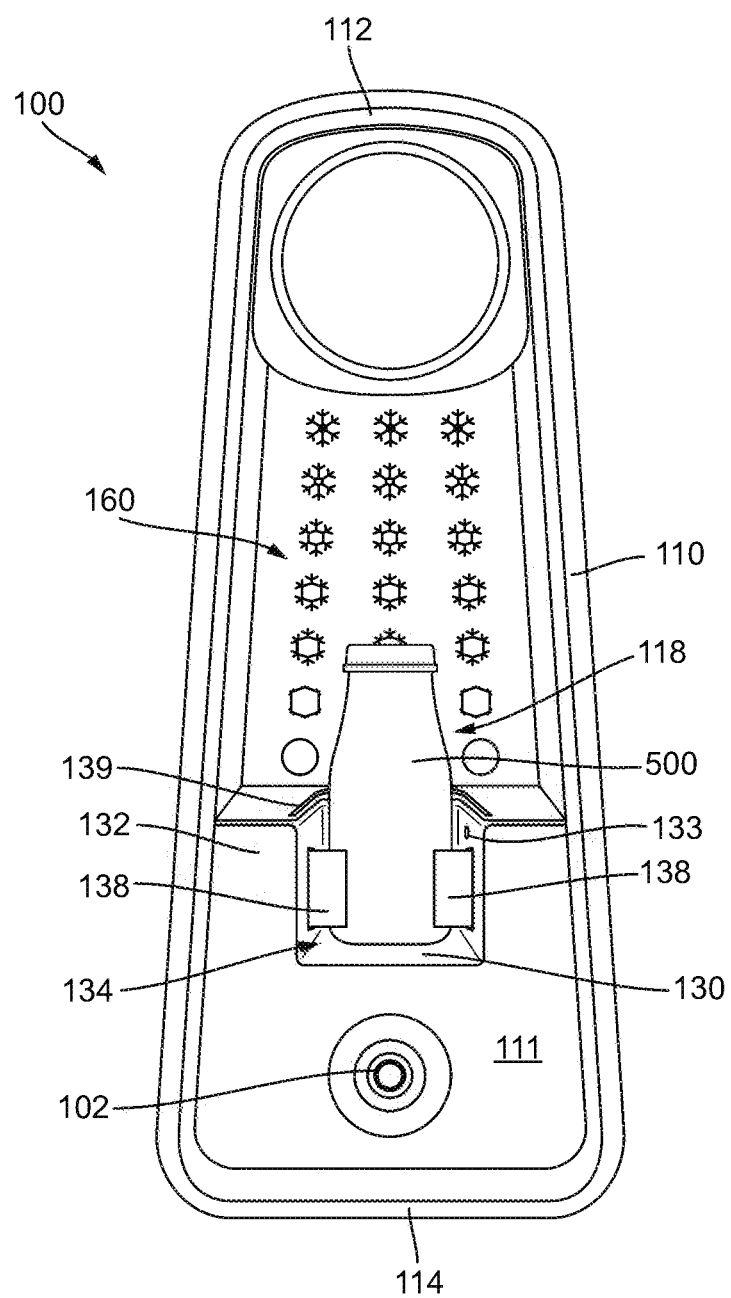
FIG. 1 shows a front perspective view of a beverage nucleation device according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

A slush beverage may be formed within a beverage container by cooling the beverage to a temperature at or below the freezing point of the beverage, and subsequently agitating the beverage so that the beverage turns into a partial solid or slush. Upon agitating the beverage, the beverage may nucleate causing formation of crystals within the beverage that propagate throughout the beverage, turning the beverage into a slush beverage.

Consumers may enjoy the ability to select a supercooled beverage and prepare a slush beverage. Consumers may also enjoy the opportunity to view nucleation of the beverage as the beverage transitions from a liquid to a slush beverage. The ability to watch the nucleation process may provide consumers with a unique and entertaining experience, and may encourage consumers to make additional purchases.

However, nucleation of the beverage may be difficult to view depending on the method of agitation. For example, it may be difficult or impossible for a consumer to view the nucleation of the beverage within the beverage container if the beverage is nucleated by dropping the beverage container onto a surface or by shaking the beverage container. Further, some devices for nucleating a beverage may obscure parts of the beverage container such that the nucleation of the beverage cannot readily be viewed. Additionally, other methods of nucleating a beverage, such as striking the beverage may dent or otherwise damage the beverage container. Thus, there is a need for a device that can nucleate a beverage within a beverage container that allows a consumer to view the nucleation process.

Further, existing devices for nucleating supercooled beverages within a beverage container may require the consumer to carry out a series of steps to nucleate the beverage. For example, a consumer may be required to select a supercooled beverage, uncap and recap the beverage, and/or to shake the beverage. The consumer may then place the beverage in a nucleation device and perform the steps required to operate the nucleation device. As a result, such devices introduce the risk of user error. If the user is unable to cause nucleation of the beverage to produce a slush beverage, the consumer may have a poor experience and may be unlikely to make additional purchases. Therefore, there is a need in the art for systems and methods that allow consumers to readily produce a slush beverage and that minimizes the risk of user error.

Some embodiments described herein relate to a beverage nucleation device that uses ultrasonic energy to cause nucleation of a supercooled beverage within a beverage container. In this way, the beverage nucleation device allows for easy and rapid formation of a slush beverage within a beverage container without having to shake, drop or strike the container, which may cause damage to the container. Further, the use of ultrasonic energy allows the beverage to be nucleated with the beverage container in a static position so that a consumer may more easily view nucleation of the beverage and the transition from liquid to a partial solid or slush.

As used herein, the term "beverage container" may refer to a bottle, can, mug, pouch, or other suitable beverage vessel. The beverage container may be composed of glass, plastic, such as polyethylene terephthalate (PET) or polypropylene (PP), or a metal, such as aluminum, among other materials. The beverage container may have any suitable shape. For example, the beverage container may have round sidewalls and may have a generally cylindrical shape, or the beverage container may have flat sidewalls so as to have a generally square transverse cross sectional area. The beverage container may be a sealed container, such as a capped bottle or an unopened can. It is understood that the beverage nucleation device described herein is not limited to use with a specific type or size of beverage container and any of various types of bottles or cans may be used.

As used herein, the term "beverage" includes any consumable free-flowing liquid or semi-liquid product, which may be carbonated or non-carbonated, including but not limited to soft drinks, water, carbonated water, dairy beverages, milkshakes, juices, alcoholic beverages, sports drinks, energy drinks, smoothies, coffee beverages, and tea beverages. As used herein, the term, "slush beverage" includes any beverage that is at least partially frozen, such that the beverage is part liquid and part solid.

A beverage or other liquid is "supercooled" when the beverage is below a freezing point of the beverage and remains in a liquid state. While the beverage is below its freezing point, the liquid may remain in a liquid state until the liquid is agitated such that nucleation of the beverage occurs.

In some embodiments, a beverage nucleation device 100 for nucleating a supercooled beverage in a beverage container 500 includes a beverage container receiving area 118 for receiving a beverage container 500 containing a supercooled beverage, as shown for example in FIG. 1. Beverage container 500 containing a supercooled beverage may be retrieved from a cooler or refrigerator configured for storing beverages in a supercooled state (see, e.g., FIG. 11). Beverage container 500 may be formed from a material that is at least partially transparent or translucent so that the beverage contained therein is visible to the consumer so that the consumer may view nucleation of the beverage. In some embodiments, beverage container 500 may be completely transparent or translucent. In some embodiments, beverage container 500 may be entirely non-transparent or opaque. Beverage nucleation device 100 may be configured as a stand-alone device and can be positioned for use on a countertop, a table, or other support surface. However, in some embodiments, beverage nucleation device 100 may be integrally formed with a cooler for storing supercooled beverages or may be securable to the cooler.

Housing 110 of beverage nucleation device 100 may include an upper end 114 opposite a lower end 112. Housing 110 is shown in FIG. 1 as tapering from lower end 112 toward upper end 114 so that housing 110 has a trapezoidal shape when viewed from the front. However, housing 110 may have various other shapes or configurations and may be shaped as a rectangular prism, a cube, a cylinder, a semi-cylinder, among various other shapes.

Housing 110 defines a beverage container receiving area 118 that is at least partially enclosed by housing 110. Beverage container receiving area 118 may receive a beverage container 500 to be nucleated. Housing 110 may further include a beverage container support 130 for supporting beverage container 500 within beverage container receiving area 118. Beverage container support 130 is configured to support beverage container 500 in an upright or standing orientation, e.g., with a lower end or bottom of beverage container 500 positioned on container support 130. In this way, beverage container 500 is visible to a consumer during the beverage nucleation process so that the consumer can view the transition of the liquid beverage to a slush beverage within the beverage container 500. In some embodiments, beverage container support 130 may include a platform and pair of upstanding sidewalls 132 defining a recess 134 in which beverage container 500 may be positioned in order to facilitate proper positioning of beverage container 500 within beverage nucleation device 100.

In some embodiments, beverage nucleation device 100 may include one or more gates 138. In some embodiments, gates 138 may be used for maintaining beverage container 500 on support 130 and within slot 134 and to prevent withdrawal of beverage container 500 from beverage nucleation device 100 during operation of device 100. Gates 138 may be movable from an open position in which beverage container can be inserted into and removed from beverage nucleation device 100, and a closed position in which beverage container 500 cannot be withdrawn from beverage nucleation device 100. When gates 138 are in the closed position (as shown in FIG. 1), gates 138 may provide an indication to a consumer that a beverage container 500 positioned on support 130 of beverage nucleation device 100 should not be removed. Upon completion of the beverage nucleation process, gates 138 may move to the open position to signal that beverage container 500 may be removed, and to allow beverage container 500 to be removed. Gates 138 may move between open and closed positions by pivoting or rotating, such as about a hinge, or gates 138 may extend or retract from support 130, such as from upstanding sidewalls 132 of support 130. In some embodiments, as shown for example in FIG. 1, beverage nucleation device 100 includes a pair of gates 138 arranged on opposing sides of support 130. However, in some embodiments, beverage nucleation device 100 may include only a single gate 138, or beverage nucleation device 100 may include three or more gates. In some embodiments, gates 138 do not entirely cover beverage container 500 so as to avoid obscuring nucleation of the beverage within beverage container 500. Thus, gates 138 may be compact and have a small profile. In some embodiments, gates 138 may be composed of a transparent material so that beverage container 500 can be viewed through gates 138.

In some embodiments, beverage nucleation device 100 may further include lights 139, such as a light strip 139, arranged on support 130. Light strip 139 may be configured to indicate when beverage nucleation device 100 is ready for use. Further, light strip 139 may be placed so as to partially surround beverage container 500 placed on support 130. When beverage nucleation device 100 is not in use, light strip 139 may be illuminated in a first color, such as white. When beverage nucleation device 100 is in use, light strip 139 may illuminate in a second color that differs from the first color, such as blue, to indicate that nucleation is in progress. Further, in some embodiments, indicator light 139 may pulse when nucleation is in progress and may stop pulsing when nucleation is complete, or may return to the first color when nucleation is complete. Thus, the light strip 139 may help to guide user in operating beverage nucleation device 100.

Beverage nucleation device 100 may further include an actuator 102 that can be operated by a consumer to begin nucleation of a beverage (i.e., to activate beverage nucleation device 100). Actuator 102 may be a push-button, a lever, a switch, a dial, a crank, or a capacitive sensor, among other types of controls or actuators. Actuator 102 may be positioned on housing 110, such as on a front surface 111 of housing 110 so that actuator 102 is readily accessible to consumers. Thus, a consumer may position a beverage container 500 containing a supercooled beverage on support 130 and can operate actuator 102 to begin the nucleation process, as described in further detail herein. As a result, the process of nucleating the beverage is simple and requires the consumer to perform limited steps (e.g., placing a selected beverage container 500 in beverage container receiving area 118 and operating actuator 102).

In some embodiments, beverage nucleation device 100 includes an indicator 160 configured to indicate a status of a beverage nucleation process, as shown for example in FIG. 1. Indicator 160 may include one or more lights or a display screen, as discussed in further detail herein. Indicator 160 may simply indicate when nucleation is complete, or indicator 160 may continuously provide an indication of the status of a nucleation process. Indicator 160 may be arranged on housing 110 and may face toward a consumer operating beverage nucleation device 100. However, in alternate embodiments, indicator 160 may be positioned on other portions of housing 110.

Figure 2:
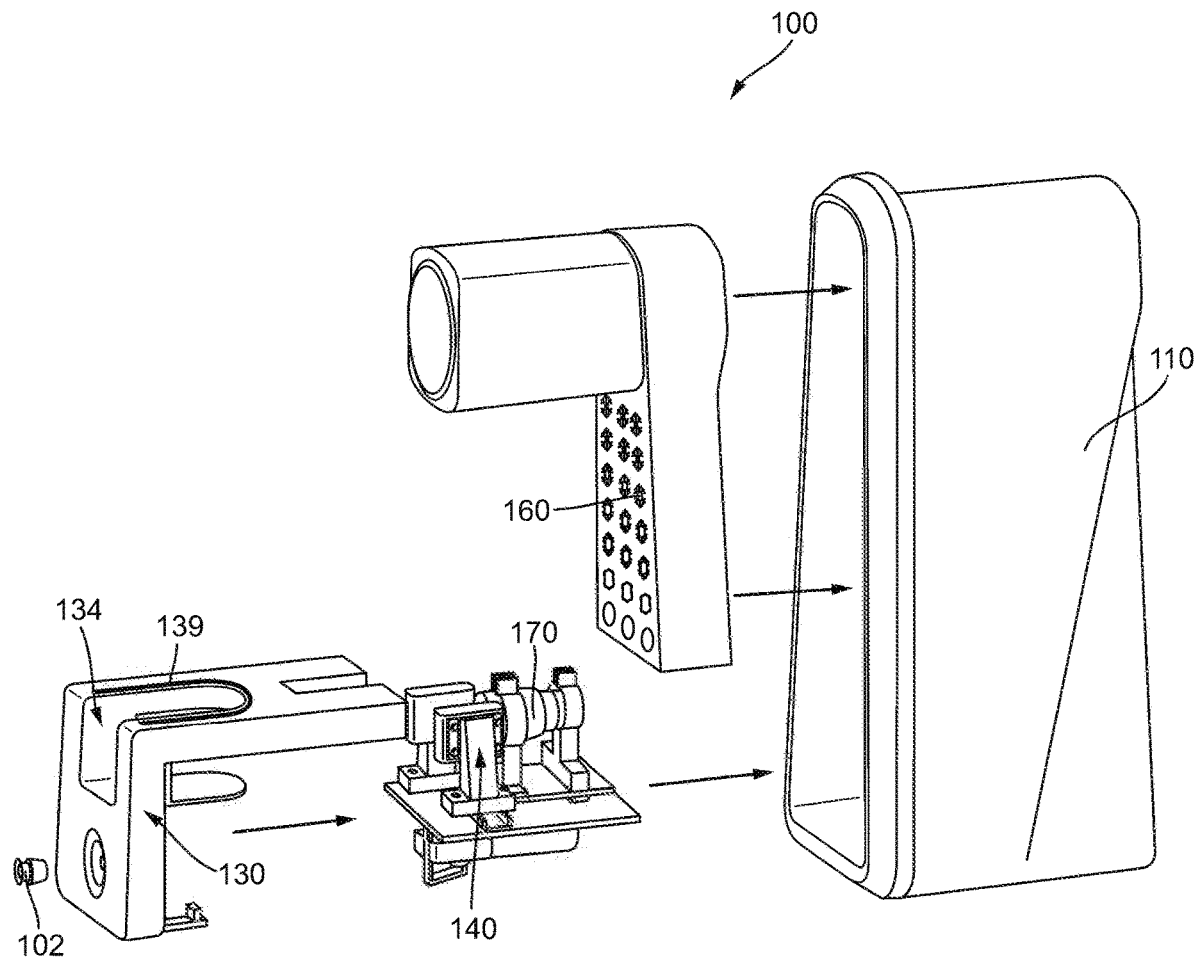
FIG. 2 shows an exploded view of components of the beverage nucleation device of FIG. 1.

Beverage nucleation device 100 may further include a beverage container holder 140 and an ultrasonic transducer 170, as shown in FIG. 2. Container holder 140 and ultrasonic transducer 170 may be arranged within housing 110, and may further be enclosed within housing 110 by support 130. When container holder 140 is in a resting position, container holder 140 may be covered by a movable wall or gate so that container holder 140 is not visible from an exterior of beverage nucleation device 100. Movable wall or gate may provide a continuous appearance with support 130 when used to cover container holder 140. When container holder 140 is extended into an operational position, movable wall or barrier may move or rotate to allow container holder 140 to move toward and contact beverage container 500 on support 130. Container holder 140 is configured to secure a beverage container 500 on support 130 so that beverage container 500 does not move during nucleation, and ultrasonic transducer 170 is configured to apply ultrasonic energy to a beverage container 500 arranged on support 130 in order to cause nucleation of the beverage within beverage container 500.

In some embodiments, beverage nucleation device 100 includes an ultrasonic transducer 170 configured to generate ultrasonic energy (also referred to herein as "ultrasound"). In some embodiments, ultrasonic transducer 170 may be a piezoelectric ultrasonic transducer. Ultrasonic transducer 170 may be similar to ultrasonic transducers 170 suitable for use in ultrasonic cleaning baths, as will be understood by one skilled in the art. Ultrasound can be used to agitate a beverage within beverage container 500 so as to cause nucleation of a supercooled beverage. Ultrasound can be applied to beverage container 500 while beverage container 500 is maintained in a static position. By keeping beverage container 500 stationary, the consumer may be able to more easily view the beverage within beverage container 500 undergoing nucleation. Further, nucleation of the beverage can occur without having to physically impact the beverage container, i.e., without having to shake, drop, or strike the beverage container, which may damage the beverage container and reduce the visibility of the beverage undergoing nucleation.

In some embodiments, ultrasonic transducer 170 may be configured to apply ultrasound having a frequency 1 kHz to 100 kHz, 10 kHz to 80 kHz, or 20 kHz to 60 kHz to beverage container 500. As the frequency falls below 1 kHz or increases above 100 kHz, the ultrasonic energy may cause little to no vibration of molecules of the beverage. As a result of lack of vibration of the beverage molecules, nucleation of the beverage may not occur.

In some embodiments, ultrasonic transducer 170 may apply ultrasonic energy with a power of 10 W to 100 W, 20 W to 80 W, or 40 W to 60 W. Ultrasonic transducer 170 has sufficient power to allow ultrasonic energy to pass through applicator 172 and beverage container 500 so as to reach beverage within beverage container 500. When power of ultrasonic transducer 170 drops below 10 W, ultrasonic transducer 170 may not have sufficient power for ultrasonic energy to pass through applicator and walls of beverage container. As nucleation may occur at power is 10 W to 100 W, power greater than 100 W may not yield despite increasing energy use.

Figure 3:
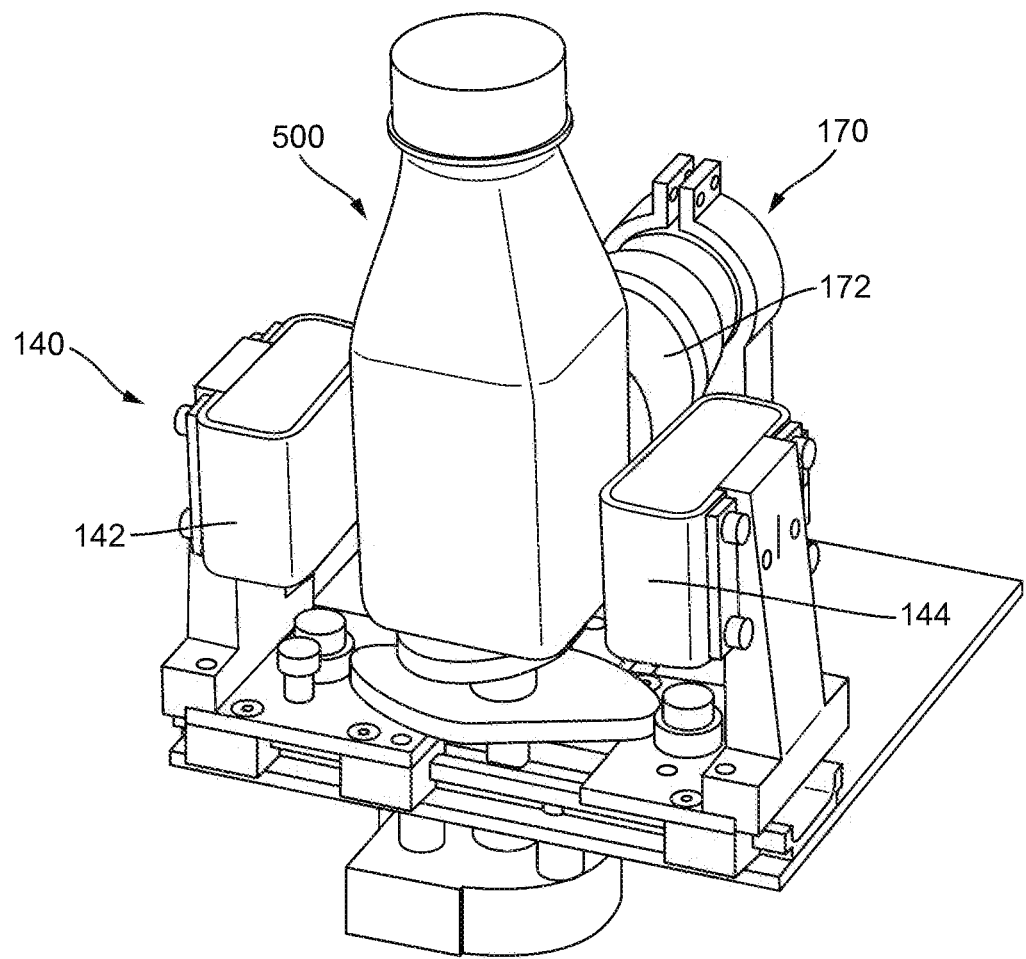
FIG. 3 shows a perspective view of a beverage container holder and an applicator of a beverage nucleation device in a resting position according to an embodiment.
Figure 4:
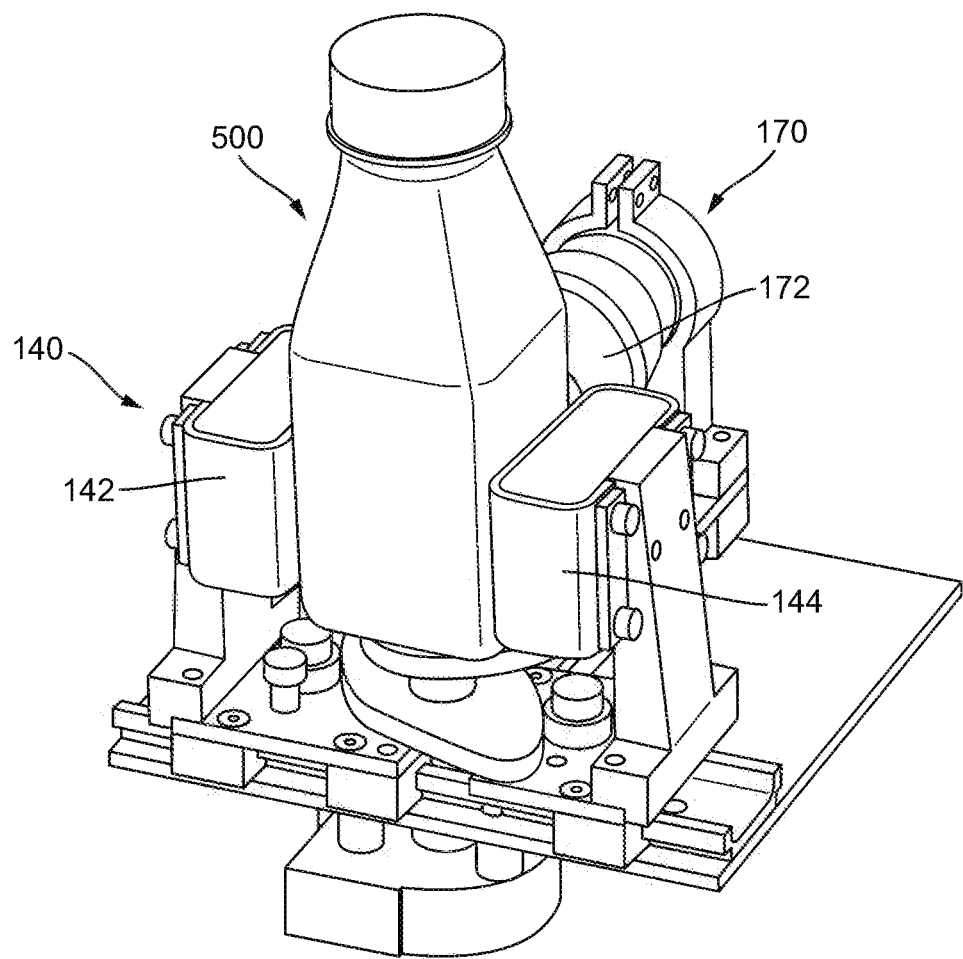
FIG. 4 shows a perspective view of the beverage container holder and the applicator of FIG. 3 in an operational position according to an embodiment.

Ultrasonic transducer 170 may include an applicator 172 for contacting beverage container 500, as shown for example in FIGS. 3-4. Ultrasonic energy may be generated by ultrasonic transducer 170 and applied to beverage container 500 via applicator 172. In some embodiments, applicator 172 may include a pad or cushion made of a flexible material, such as an elastomer. For example, applicator 172 may include rubber, such as ethylene propylene rubber (EPDM), silicone rubber, fluoroelastomers, polyether block amides (PEBA), or nitrile rubber, among others. The inventors of the present application found that the use of a flexible material, such as elastomeric materials, allows for more efficient transfer of ultrasound energy to beverage containers and promotes nucleation of the beverage within a beverage container compared to stiffer or more rigid materials. Air is a poor transmitter of ultrasound and thus any misalignment or gaps between applicator 172 and beverage container 500 may result in significant loss of power, inhibiting transfer of ultrasound energy to beverage within beverage container 500, and resulting in loss of power. In some embodiments, applicator 172 may include a material having a Shore A hardness of about 5. Further, in some embodiments, applicator 172 may include a material having a 100% modulus of 14 to 16 psi.

Applicator 172 is configured to be placed in contact with a sidewall of beverage container 500 containing a supercooled beverage to be nucleated. Applicator 172 may be sized and shaped accordingly. Applicator 172 may be positioned so as to contact a mid portion of a beverage container 500 between a lower end and an upper end of beverage container 500. Ultrasound energy may be applied to beverage container 500 in a transverse direction of beverage container 500. In this way, application of ultrasound to a beverage within beverage container 500 causes nucleation to first occur in a central or middle portion of beverage container 500. Nucleation of beverage may proceed from the middle of beverage container 500 toward the upper end and toward the lower end of beverage container 500. Application of ultrasound energy to a sidewall of beverage container 500 is believed to allow nucleation of the beverage to occur more rapidly than application of ultrasound to an upper end or lower end of beverage container 500. However, in some embodiments, applicator 172 may be configured to contact an upper portion or a lower portion of a sidewall of beverage container 500 such that ultrasonic energy is applied to beverage container in a transverse direction at the upper portion or lower portion of beverage container 500. In some embodiments, applicator 172 may be configured to contact a top surface or a bottom surface of beverage container 500.

Figure 5:
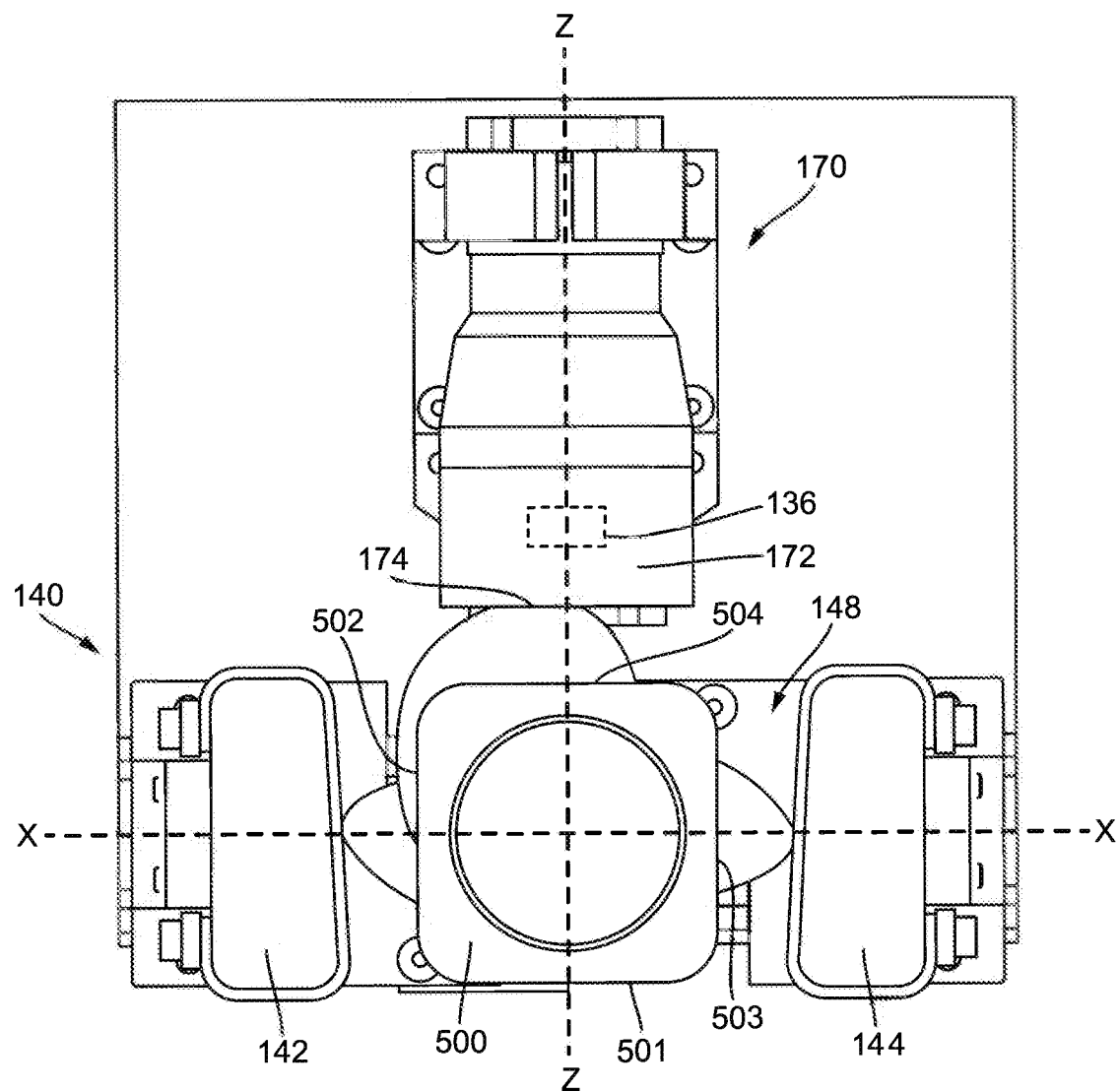
FIG. 5 shows a top-down view of a beverage container holder and an applicator of a beverage nucleation device in a resting position according to an embodiment.
Figure 6:
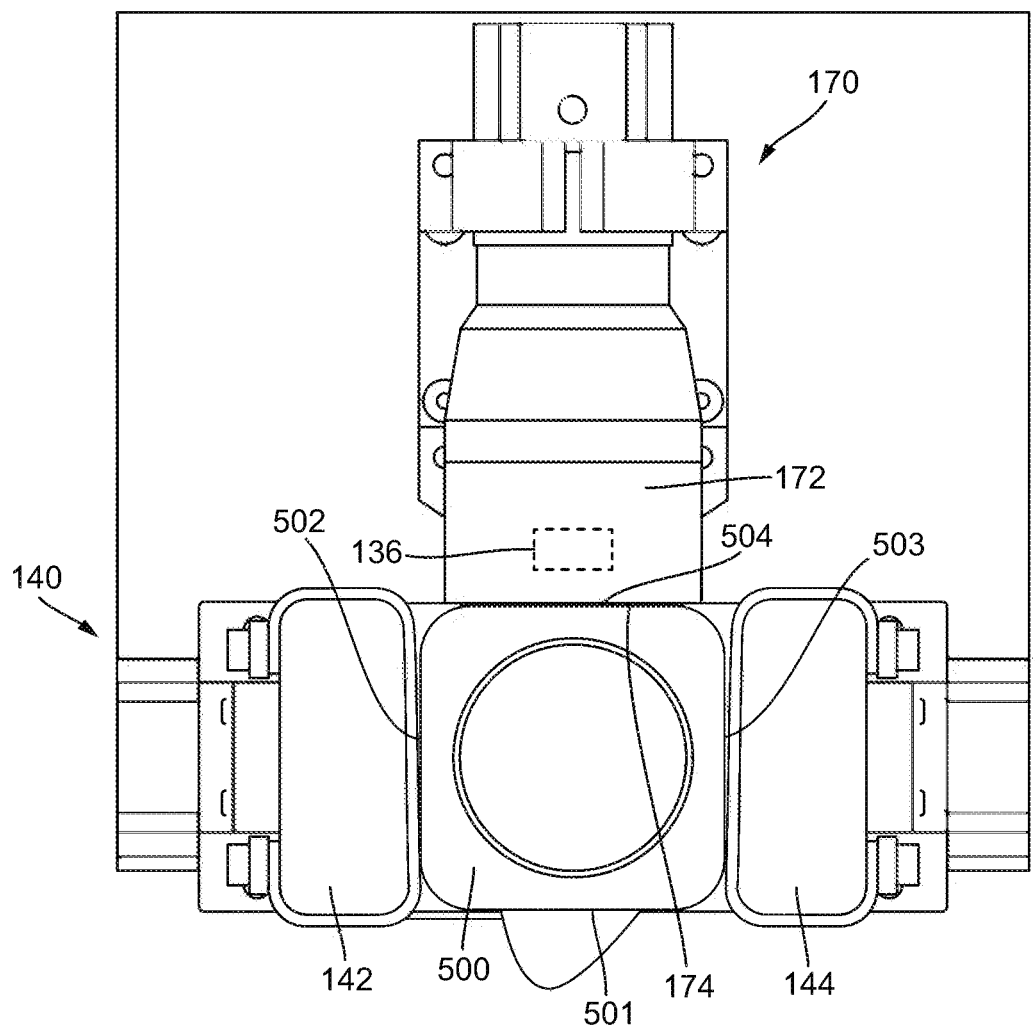
FIG. 6 shows a top-down view of the beverage container holder and the applicator of the beverage nucleation device of FIG. 5 in an operational position according to an embodiment.
Figure 7:
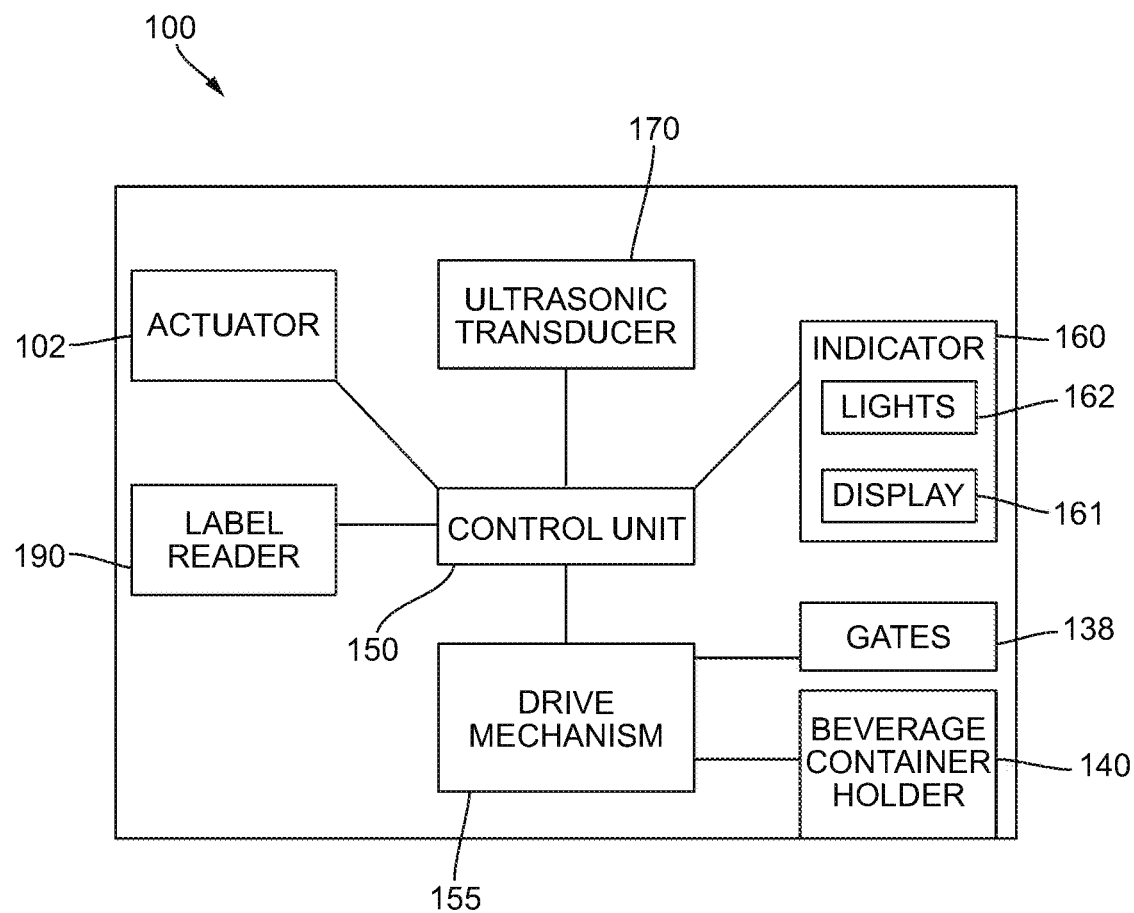
FIG. 7 shows a schematic diagram of components of a beverage nucleation device according to an embodiment.

Applicator 172 includes a contact surface 174 configured to be placed in contact with a sidewall of beverage container 500, as shown for example in FIGS. 5 and 6. In some embodiments, contact surface 174 is flat or planar (see, e.g., FIG. 6) so as to be placed in facing engagement with a flat wall of a beverage container 500. However, in some embodiments, contact surface 174 may be curved and may have a concave curvature so as to match the curvature of a beverage container having a curved sidewall. Contact surface 174 may be placed in facing engagement with a sidewall of beverage container 500.

In some embodiments, contact surface 174 of applicator 172 may have an area of 0.5 $in^2$ to 9 $in^2$, 1 $in^2$ to 8 $in^2$, or 1.5 $in^2$ to 7 $in^2$. In some embodiments, the contact surface 174 may have an area of about 3 $in^2$. Increasing the area of contact of applicator 172 and beverage container 500 may result in more efficient transfer of ultrasonic energy to the beverage. As a result, nucleation of a beverage may occur more rapidly as a contact area increases, and the amount of energy required to nucleate the beverage may be reduced. This may be particularly important for beverage containers having thick sidewalls, such as glass beverage containers.

In some embodiments, applicator 172 may be arranged so as to contact a rear wall 504 of beverage container 500 on support 130, as shown in FIGS. 3-6. In this way, beverage container 500 can be viewed by a consumer during nucleation and applicator 172 does not obscure the consumer's view of beverage container 500, and specifically a front sidewall 501 of beverage container 500, from a front of beverage nucleation device 100.

In some embodiments, beverage nucleation device 100 may be configured to apply ultrasonic energy to beverage container 500 via ultrasonic transducer 170 for a predetermined period of time, for example, 1 to 10 seconds. The amount of time ultrasonic energy is applied to cause nucleation of a beverage may depend upon several factors including the power of the ultrasonic transducer, the frequency of the ultrasonic energy, the material of the applicator, the type of beverage container, and the type of beverage, among other factors as will be appreciated by one skilled in the art. While ultrasonic energy may be applied for a predetermined period of time to induce nucleation of the beverage, it is understood that nucleation of the beverage may continue to occur after ultrasonic energy is no longer applied. In some embodiments, the predetermined period of time is determined based on the type of beverage to be nucleated. In such embodiments, beverage nucleation device 100 may include a sensor 133 configured to detect the type of beverage to be nucleated, such as by detecting a label, barcode, or other identifier of a beverage container, and selecting the predetermined period of time based on the type of beverage container as determined by the sensor.

In some embodiments, applicator 172 may be configured to move between a resting position and an operational position. In the resting position, as shown in FIG. 5, applicator 172 is spaced from a beverage container 500 arranged on support 130. In the operational position, applicator 172 is moved toward beverage container 500 so that a contact surface 174 of applicator 172 is placed in facing engagement with a sidewall, such as a rear wall 504, of beverage container 500. Applicator 172 may be configured to move a predetermined distance from the resting to the operational state, or the applicator 172 may be configured to move a sufficient distance for applicator 172 to contact beverage container 500. In such embodiments, applicator 172 may include a sensor 136, such as a pressure sensor or proximity sensor, configured to determine when applicator 172 contacts beverage container 500.

In some embodiments, beverage nucleation device 100 may additionally include a beverage container holder 140 configured to maintain beverage container 500 in a static position during operation of beverage nucleation device 100. In some embodiments, container holder 140 may be shaped so as to fit closely to a beverage container, such as by a friction fit. In some embodiments, container holder 140 is in a fixed position and a consumer may insert beverage container into container holder 140 so that container is tightly held by container holder 140. However, in some embodiments, container holder 140 may be movable and is selectively brought into contact with a beverage container 500 during operation of beverage nucleation device 100. In some embodiments, container holder 140 may be, for example, a clamp that is movable from an open position for receiving a beverage container, and a closed position for securing the beverage container. Container holder 140 may be manually operated so that a consumer can move container holder 140 from an open to a closed position. Alternatively, container holder 140 may be automated so that once a beverage container is positioned in beverage container receiving area, beverage nucleation device 100 automatically moves container holder 140 to a closed position so that beverage container 500 is secured in a static position for nucleation.

In some embodiments, beverage nucleation device 100 includes a beverage container holder 140 having one or more arms 142, 144, as shown for example in FIGS. 3-6. Beverage container 500 may be positioned in a space 148 between first and second arms 142, 144 on beverage container support 130. In some embodiments, container holder 140 may include a first arm 142 and a second arm 142, as shown in FIGS. 3-6. First arm 142 is arranged opposite second arm 142 such that first and second arms 142, 144 face one another and are separated by a space 148 in which beverage container may be positioned. First and second arms 142, 144 are linearly movable along a common axis X (see FIG. 5). First and second arms 142, 144 are configured to move towards one another for securing a beverage container 500 therebetween, and are further configured to move away from one another for releasing beverage container 500. First and second arms 142, 144 may be configured to move a predetermined distance for contacting a beverage container 500 positioned in space 148 between first and second arms 142, 144. Alternatively, arms 142, 144 may be configured to continue to move toward beverage container 500 until each arm 142, 144 contacts beverage container 500. In such embodiments, arms 142, 144 may include a sensor, such as a pressure sensor or proximity sensor configured to determine when arms 142, 144 contact beverage container 500. In this way, container holder 140 may secure beverage containers 500 of different sizes, such as bottles of different diameters. For example, a small or skinny bottle may require the arms 142, 144 of container holder 140 to move a further distance than a wider or larger bottle in order for arms 142, 144 to contact the beverage container 500.

When beverage nucleation device 100 is not in use, beverage container holder 140 is arranged in a resting position, with first and second arms 142, 144 separated from one another by a first distance, as shown in FIG. 5. When beverage nucleation device 100 is in use, e.g., when a beverage container 500 is placed on support 130 and actuator 102 is actuated, beverage container holder 140 moves into the operational position. In the operational position, first and second arms 142, 144 are in contact with opposing sidewalls 502, 503 of beverage container 500 and are separated by a second distance that is smaller than the first distance, as shown in FIG. 6.

In some embodiments, applicator 172 and beverage container holder 140 may move from the resting to the operational position simultaneously or nearly simultaneously. In some embodiments, beverage container holder 140 may move from resting position to operational position and then subsequently applicator 172 is moved from resting position to operational position. In this way, beverage nucleation device 100 may ensure that beverage container 500 is secured prior to moving applicator 172 into contact with beverage container 500.

In some embodiments, beverage nucleation device 100 includes a control unit 150 for controlling operation of beverage nucleation device 100 and its components. Control unit 150 may be in communication with actuator 102 such that when actuator 102 is operated by a consumer, control unit 150 causes beverage nucleation device 100 to carry out a beverage nucleation process. Control unit 150 may further be in communication with a drive mechanism 155, and drive mechanism 155 may cause movement of beverage container holder 140 from the resting position to the operational position. Drive mechanism 155 may include an electrical motor or a linear actuator, among others. Drive mechanism 155 may also cause movement of applicator 172 from the resting position to the operational position. Further, drive mechanism 155 may cause movement of gates 138 from resting position to operational position. In some embodiments, beverage container holder 140, applicator 172, and/or gates 138 may each have a separate drive mechanism operated by control unit 150.

Control unit 150 may cause ultrasonic transducer 170 to generate ultrasonic energy, and to stop generating and applying ultrasonic energy after a predetermined period of time (e.g., 1 to 10 seconds).

Figure 8:
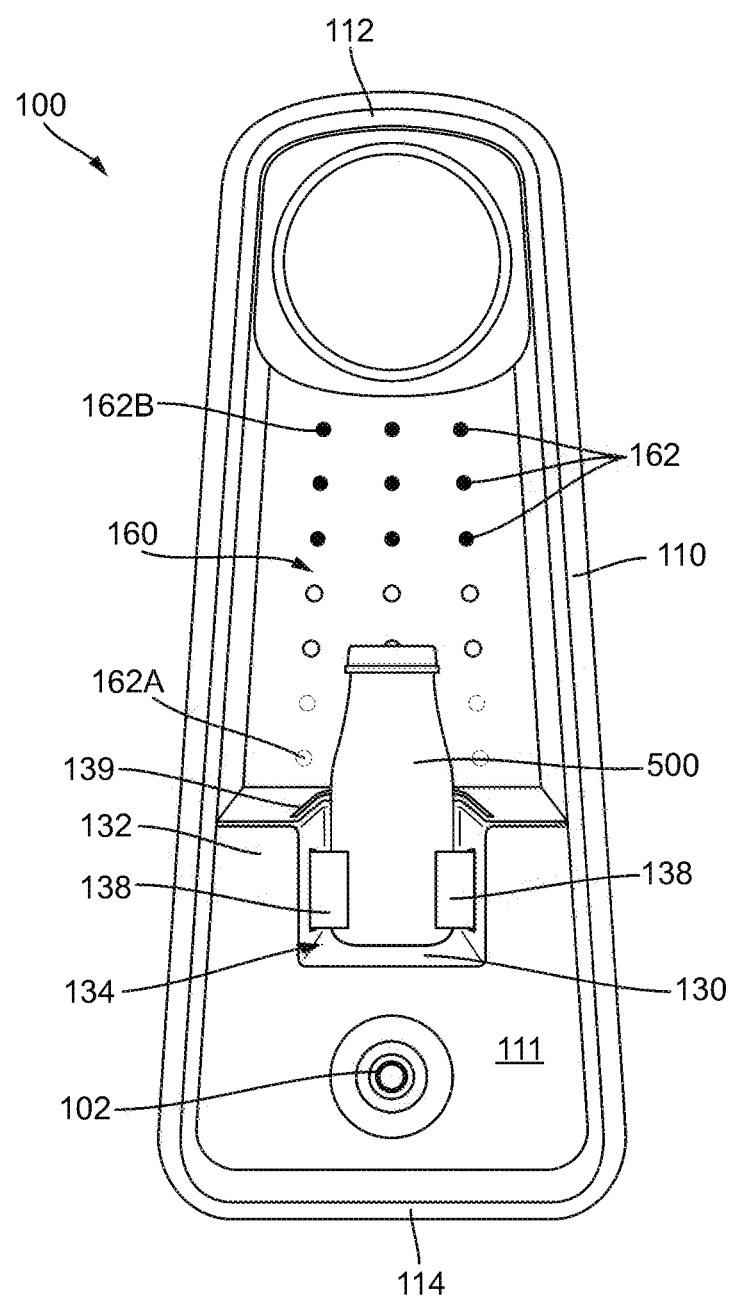
FIG. 8 shows a front view of a beverage nucleation device having an indicator comprising lights according to an embodiment.

Control unit 150 may also control operation of light strip 139 and indicator 160. As discussed above, light strip 139 is configured to indicate when beverage nucleation device 100 is ready for use. Further, indicator 160 is configured to indicate the status or progress of a beverage nucleation process, as shown for example in FIG. 8. In one embodiment, indicator 160 includes one or more lights 162. Lights 162 may include light emitting diodes (LEDs), incandescent lamps, compact fluorescent lamps, or halogen lamps, among other types of lights. Lights 162 may be turned off (not illuminated), and may illuminate once the nucleation process is complete in order to indicate that the beverage is ready to be consumed.

In some embodiments, indicator 160 may include a color transition in which lights 162 are originally illuminated in a first color and lights 162 transition to a second color during the nucleation process. Thus, lights 162 may be illuminated in a first color at the outset of the beverage nucleation process and lights 162 may gradually change or transition to a second color that differs from the first color during the nucleation process. For example, lights 162 may be illuminated in a white color and may gradually transition from white to blue, such that when all lights 162 are illuminated in the blue color, the nucleation process is complete. In a further example, all lights 162 may be illuminated in a white color 162A, and some lights may turn blue 162B during nucleation process, with an increasing number of lights turning blue as the process progresses, until all lights are blue. A color transition from white to blue is illustrative, and any color transition may be used (e.g., yellow to green, red to purple, etc.). The rate of progress of the color transition may be based on the predetermined time for nucleation.

Figure 9:
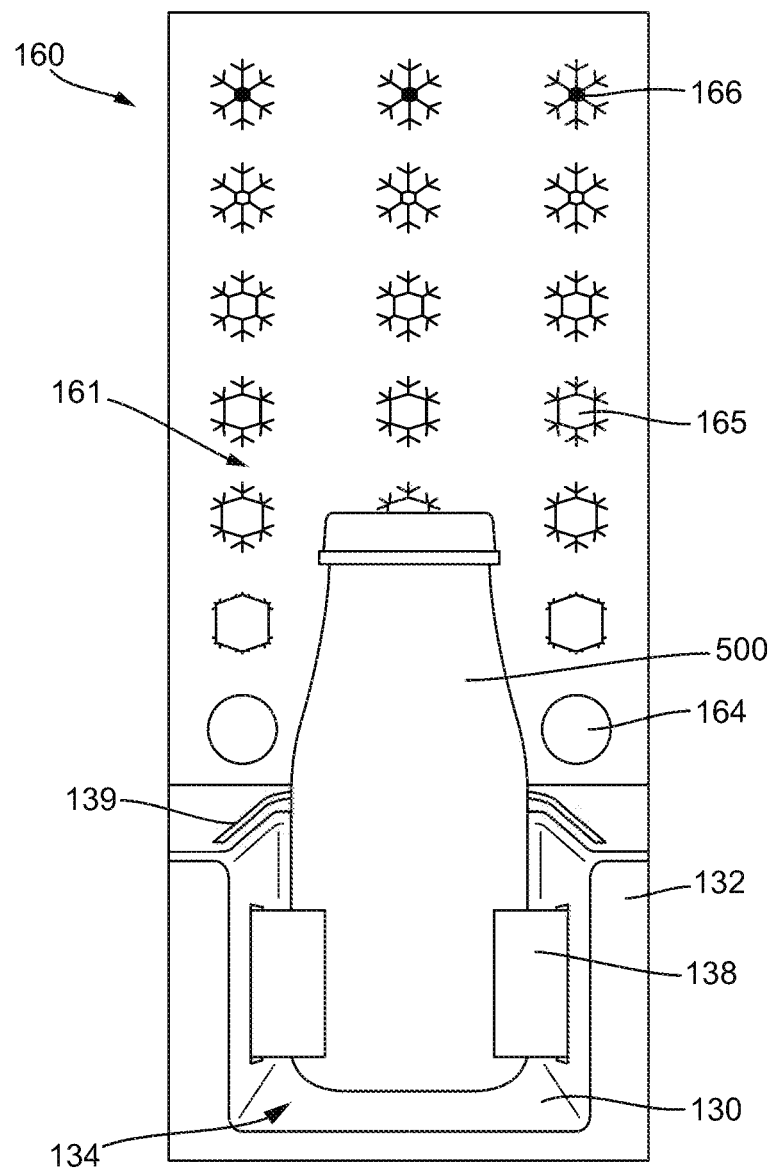
FIG. 9 shows a front view of a beverage nucleation device having an indicator comprising a display according to an embodiment.

In some embodiments, indicator 160 may include a display 161, as shown for example in FIG. 9. Display 161 may be, for example, a liquid crystal display (LCD), a light emitting diode (LED) display, or an organic LED (OLED) display, among other types of displays 161. Display 161 may operate in the same manner as lights 162 and thus may display a color transition in which the display or portions thereof illuminate in a first color and transition to a second color during the beverage nucleation process.

In some embodiments, display 161 may show a plurality of first icons 164 that transition to second icons 166 during the beverage nucleation process, referred to as an icon transition. For example, first icons 164 may include circles or dots as shown in FIG. 9. As beverage nucleation process progresses, first icons 164 may transition from circles or dots to a second icon 166 that differs from the first icon, such as a snowflake. Thus, at the outset of beverage nucleation only first icons 164 are shown, during nucleation both first icons 164 and second icons 166 are shown (or a transitional icon 165 having features of both first and second icons 164, 166 may be shown), with an increasing number of second icons 166 being shown as nucleation progresses. Finally, at completion of nucleation, all icons are shown as second icons 166.

In some embodiments, indicator 160 may show or provide both a color transition and an icon transition to illustrate the progress of the nucleation process. For example, icons may be shown as white circles at the beginning of the nucleation process and the icons may transition to blue snowflakes at the end of the nucleation process.

In some embodiments, indicator 160 may alternatively or additionally include a timer that shows a countdown of the time remaining in the nucleation process. For example, nucleation may take 10 seconds and timer may display "10 seconds" and count down (e.g., 9 seconds, 8 seconds, 7 seconds, etc.) until nucleation is complete.

Figure 10:
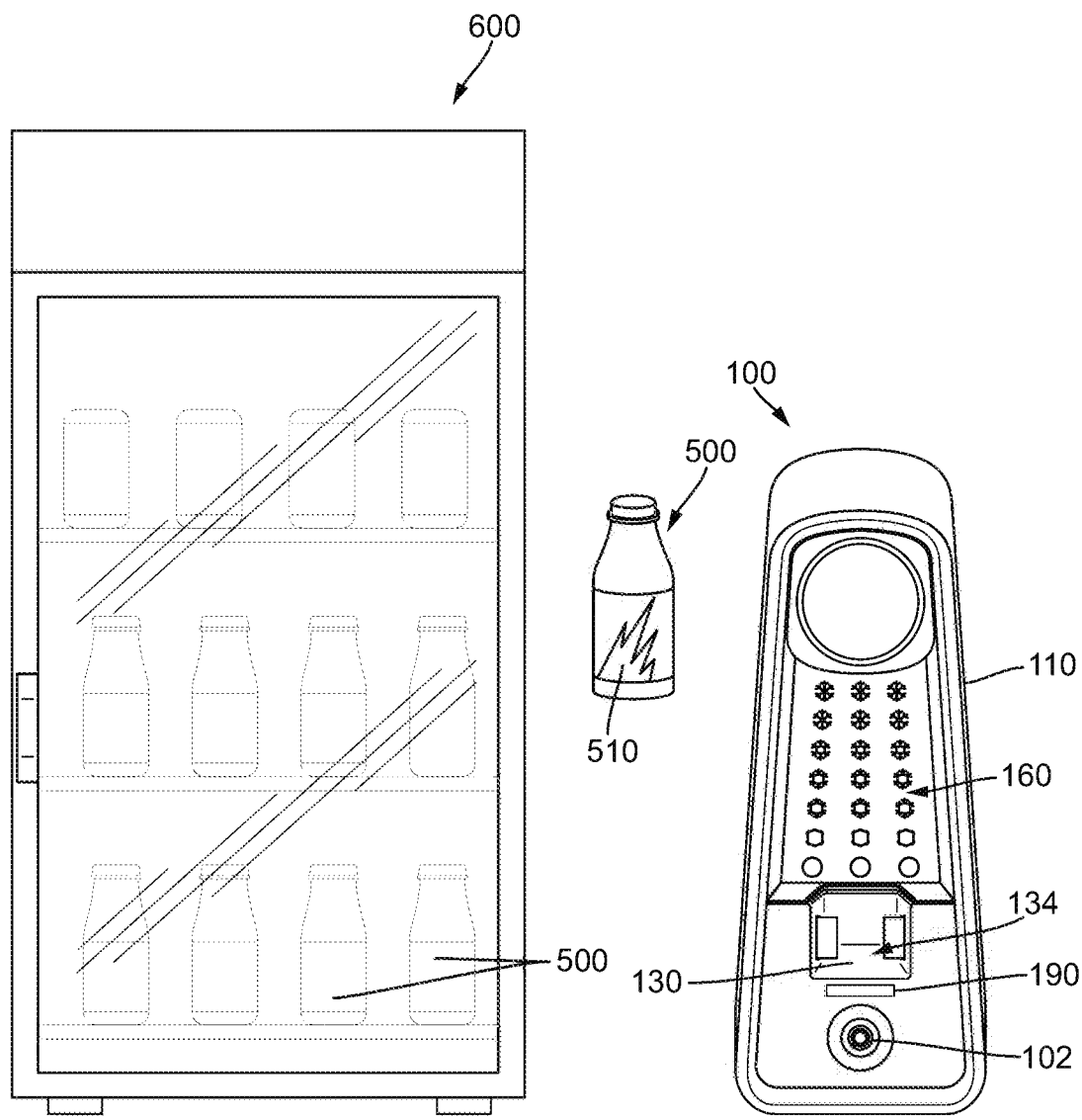
FIG. 10 shows a front view of a beverage nucleation device, a cooler, and a beverage container having a label according to an embodiment.

In some embodiments, beverage container 500 for use with beverage nucleation device 100 may include a label 510 as shown in FIG. 10. Label 510 may indicate when beverage container 500 (and beverage contained therein) is at a suitable temperature for nucleation, such as a temperature at or below a freezing point of the beverage. Label 510 may be, for example, a thermochromic label that is configured to change color when a beverage within the container is at or below the freezing point of the beverage. In this way, a consumer may easily determine that a particular beverage is ready for nucleation by viewing the color of the thermochromic label.

In such embodiments, beverage nucleation device 100 may include a label reader 190 configured to detect or read label 510 to determine if beverage container 500 is at a temperature suitable for nucleation. Label reader 190 may be, for example, an optical sensor, such as a camera or the like, configured to detect a color of label 510. If label reader 190 determines that beverage container 500 is at a temperature suitable for nucleation based on a color of label 510, beverage nucleation device 100 may automatically begin nucleation of beverage within beverage container 500, or may allow a consumer to begin nucleation by operating actuator 102. However, if label reader 190 determines that beverage container 500 is not at a temperature suitable for nucleation, beverage nucleation device 100 may not start the nucleation process even if actuator 102 is operated. Beverage nucleation device 100 may further display an error message or audible alert to indicate to the consumer that the selected beverage container 500 is not ready to be nucleated.

Figure 11:
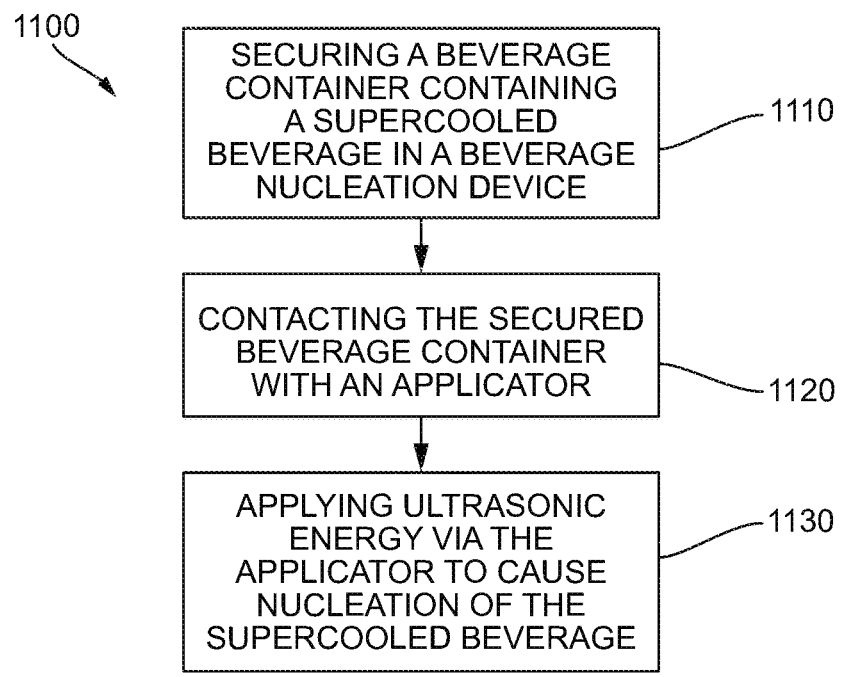
FIG. 11 shows a method of nucleating a supercooled beverage using a beverage nucleation device.

An exemplary method of nucleating a beverage using a beverage nucleation device 1100 is shown for example in FIG. 11. A beverage container containing a supercooled beverage may be secured in a beverage nucleation device 1110. Once secured in the beverage nucleation device, the beverage container may be contacted by the applicator of the beverage nucleation device 1120. Ultrasonic energy can then be applied to the beverage container via the applicator to cause nucleation of the supercooled beverage 1130.

Figure 12:
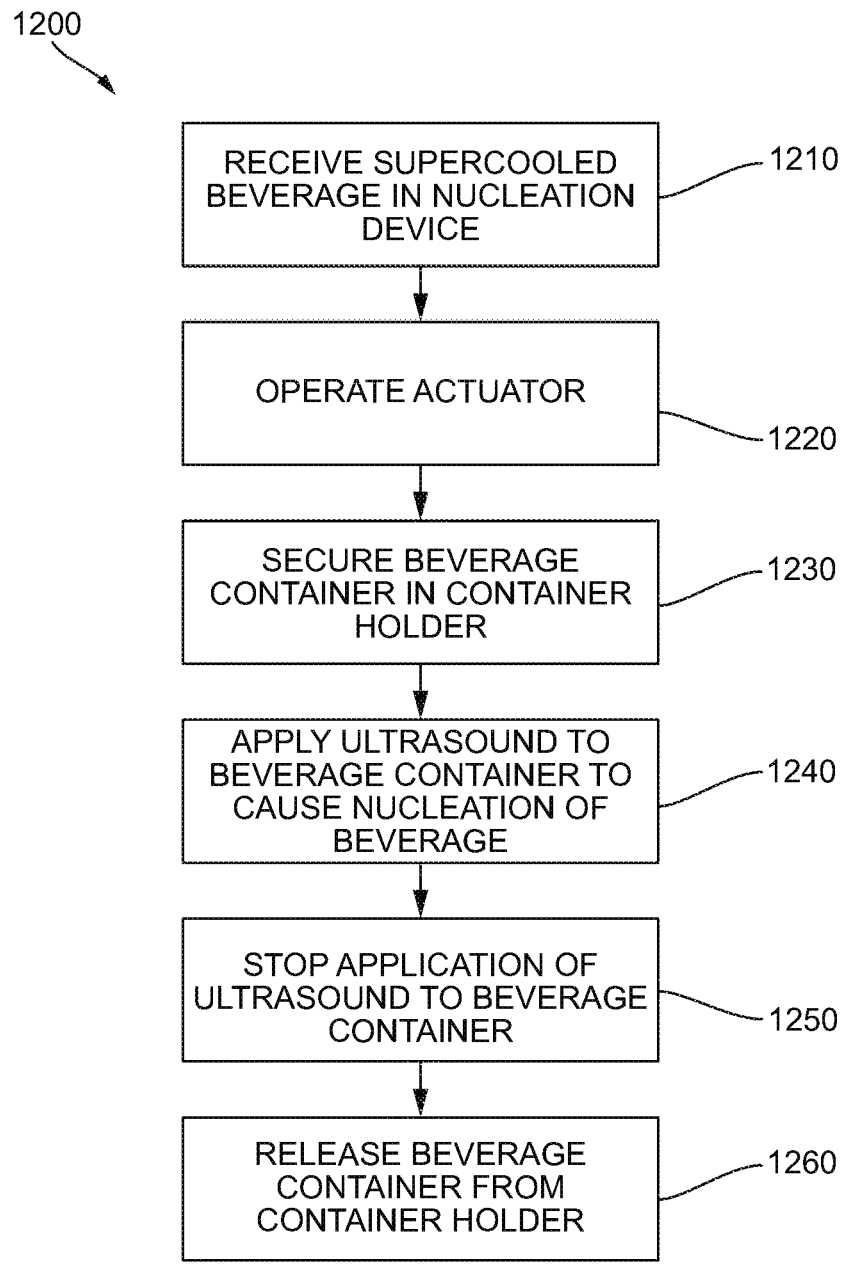
FIG. 12 shows a method of nucleating a supercooled beverage using a beverage nucleation device according to an embodiment.

An exemplary method of using a beverage nucleation device as described herein to nucleate a beverage 1200 is shown in FIG. 12. In operation, a consumer may retrieve a beverage container containing a supercooled beverage, such as from a cooler or refrigerator for storing beverages at or below their freezing points. Consumer may place the beverage container in the beverage nucleation device 1210, such as on support of the beverage nucleation device within a beverage container receiving area of beverage nucleation device. Consumer may operate the actuator 1220 in order to begin the nucleation process. For example, actuator may be a push-button, and consumer may press the push-button. Upon operating actuator, beverage container may be secured on support by a beverage container holder 1230. Beverage container holder may include a pair of arms that move from a resting position to an operational position in which the pair of arms contacts opposing sidewalls of the beverage container so as to hold beverage container in a static position. Applicator of ultrasound transducer is moved from a resting position into an operational position in which applicator is in contact with a sidewall of a beverage container, such as a rear sidewall, and ultrasound is applied to beverage container via the applicator to cause nucleation of the beverage 1240. Applicator may be moved into contact with beverage container at a same time as container holder is moved into the operational position. With applicator in contact with beverage container, ultrasound may be generated by an ultrasonic transducer and applied for a predetermined period of time (e.g., 1 to 10 seconds). After the predetermined period of time elapses, the beverage nucleation device may cease generation and application of ultrasonic energy via ultrasonic transducer 1250. Applicator may be removed from contact with beverage container, and similarly beverage container holder may move from operational position to resting position so that beverage container is no longer held or supported by beverage container holder 1260. Applicator and container holder may be moved at the same time or in succession. Beverage container containing a slush beverage may then be removed from beverage nucleation device by the consumer.

Figure 13:
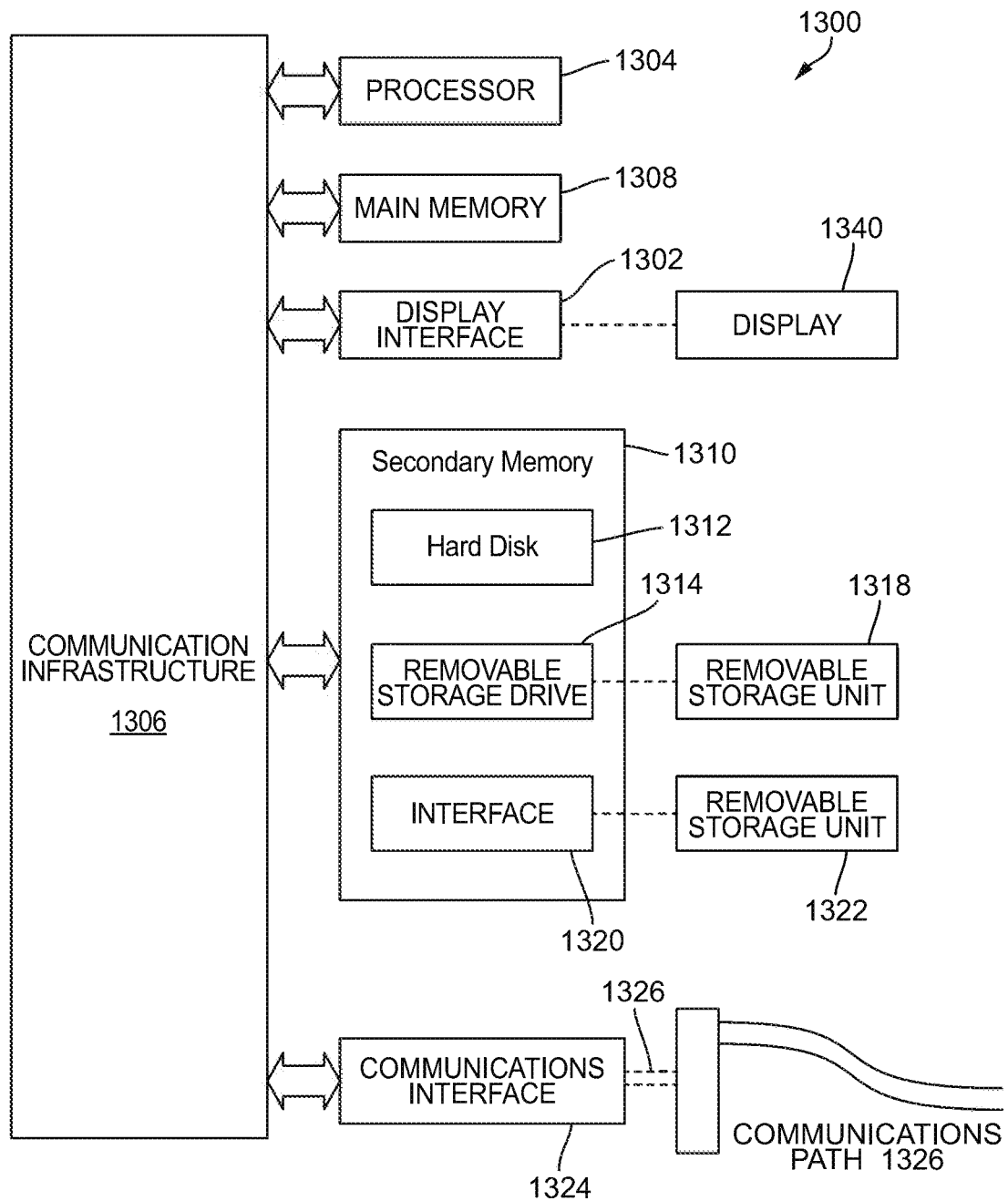
FIG. 13 shows a schematic block diagram of an exemplary computer system in which embodiments may be implemented.

FIG. 13 illustrates an exemplary computer system 1300 in which embodiments, or portions thereof, may be implemented as computer-readable code. A control unit 150 as discussed herein may be a computer system having all or some of the components of computer system 1300 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 1300. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1304 may be a special purpose or a general purpose processor device. As will be appreciated by persons skilled in the relevant art, processor device 1304 may also be a single processor in a multi-core/multiprocessor system, such system operating alone, or in a cluster of computing devices operating in a cluster or server farm. Processor device 1304 is connected to a communication infrastructure 1306, for example, a bus, message queue, network, or multi-core message-passing scheme.

Computer system 1300 also includes a main memory 1308, for example, random access memory (RAM), and may also include a secondary memory 1310. Secondary memory 1310 may include, for example, a hard disk drive 1312, or removable storage drive 1314. Removable storage drive 1314 may include a floppy disk drive, a magnetic tape drive, an optical disk drive, a flash memory, or the like. The removable storage drive 1314 reads from and/or writes to a removable storage unit 1318 in a well-known manner. Removable storage unit 1318 may include a floppy disk, magnetic tape, optical disk, a universal serial bus (USB) drive, etc. which is read by and written to by removable storage drive 1314. As will be appreciated by persons skilled in the relevant art, removable storage unit 1318 includes a computer usable storage medium having stored therein computer software and/or data.

Computer system 1300 (optionally) includes a display interface 1302 (which can include input and output devices such as keyboards, mice, etc.) that forwards graphics, text, and other data from communication infrastructure 1306 (or from a frame buffer not shown) for display on display 1340.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communication interface 1324. Communication interface 1324 allows software and data to be transferred between computer system 1300 and external devices. Communication interface 1324 may include a modem, a network interface (such as an Ethernet card), a communication port, a PCMCIA slot and card, or the like. Software and data transferred via communication interface 1324 may be in the form of signals, which may be electronic, electromagnetic, optical, or other signals capable of being received by communication interface 1324. These signals may be provided to communication interface 1324 via a communication path 1326. Communication path 1326 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1318, removable storage unit 1322, and a hard disk installed in hard disk drive 1312. Computer program medium and computer usable medium may also refer to memories, such as main memory 1308 and secondary memory 1310, which may be memory semiconductors (e.g. DRAMs, etc.).

Computer programs (also called computer control logic) are stored in main memory 1308 and/or secondary memory 1310. Computer programs may also be received via communication interface 1324. Such computer programs, when executed, enable computer system 1300 to implement the embodiments as discussed herein. In particular, the computer programs, when executed, enable processor device 1304 to implement the processes of the embodiments discussed here. Accordingly, such computer programs represent controllers of the computer system 1300. Where the embodiments are implemented using software, the software may be stored in a computer program product and loaded into computer system 1300 using removable storage drive 1314, interface 1320, and hard disk drive 1312, or communication interface 1324.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A method for nucleating a supercooled beverage in a beverage container using a beverage nucleation device, comprising:
    securing the beverage container containing the supercooled beverage in the beverage nucleation device, wherein securing the beverage container comprises moving a first arm of a beverage container holder into contact with a first portion of a sidewall of the beverage container and moving a second arm of the beverage container holder into contact with a second portion of the sidewall of the beverage container opposite the first portion of the sidewall;
    contacting the secured beverage container with an applicator of the beverage nucleation device, wherein the applicator comprises an elastomeric material; and
    applying ultrasonic energy to the beverage container via the applicator so as to cause nucleation of the supercooled beverage within the beverage container.

2. The method of claim 1, wherein the first and second arms of the beverage container holder are moved by a drive mechanism of the beverage nucleation device.

3. The method of claim 1, wherein securing the beverage container comprises securing the beverage container in an upright orientation.

4. The method of claim 1, wherein contacting the secured beverage container with an applicator comprises placing a contact surface of the applicator in facing engagement with a sidewall of the secured beverage container.

5. The method of claim 1, further comprising generating the ultrasonic energy via an ultrasonic transducer of the beverage nucleation device.

6. The method of claim 1, further comprising applying the ultrasonic energy for a predetermined period of time.

7. The method of claim 1, further comprising indicating completion of nucleation of the supercooled beverage via an indicator of the beverage nucleation device.

8. The method of claim 1, comprising applying ultrasonic energy having a frequency of 1 kHz to 100 kHz.

9. The method of claim 1, wherein contacting the secured beverage container with the applicator of the beverage nucleation device comprises moving the applicator, by a drive mechanism of the beverage nucleation device, from a resting position to an operational position in which the applicator contacts a sidewall of the beverage container.

10. The method of claim 1, further comprising:
    moving, by a drive mechanism of the beverage nucleation device, one or more gates of the beverage nucleation device to a closed position prior to applying the ultrasonic energy to the beverage container in order to prevent removal of the beverage container from the beverage nucleation device.

11. The method of claim 10, further comprising:
moving, by the drive mechanism of the beverage nucleation device, the one or more gates of the beverage nucleation device to an open position, after applying the ultrasonic energy to the beverage container in order to allow the beverage container to be removed from the beverage nucleation device.

12. A method for nucleating a supercooled beverage in a beverage container using a beverage nucleation device, comprising:
securing the beverage container containing the supercooled beverage in the beverage nucleation device;
contacting the secured beverage container with an applicator of the beverage nucleation device, wherein the applicator comprises an elastomeric material;
moving, by a drive mechanism of the beverage nucleation device, one or more gates of the beverage nucleation device to a closed position in order to prevent removal of the beverage container from the beverage nucleation device; and
applying ultrasonic energy to the beverage container via the applicator so as to cause nucleation of the supercooled beverage within the beverage container, wherein the ultrasonic energy is applied after moving the one or more gates of the beverage nucleation device to the closed position.

13. The method of claim 12, further comprising:
moving, by the drive mechanism of the beverage nucleation device, the one or more gates of the beverage nucleation device to an open position, after applying the ultrasonic energy to the beverage container in order to allow the beverage container to be removed from the beverage nucleation device.

14. The method of claim 13, wherein the one or more gates moves between the open position and the closed position by rotating about a hinge.

15. The method of claim 13, wherein the one or more gates moves between the open position and the closed position by extending or retracting from a support.

16. The method of claim 12, wherein the one or more gates comprise a transparent material such that the beverage container can be viewed through the one or more gates when the one or more gates is in the closed position.

17. The method of claim 12, wherein the one or more gates provide an indication that the beverage container should not be removed when the one or more gates is in the closed position.

18. The method of claim 12, wherein the one or more gates comprises two gates arranged on opposing sides of a support.

19. The method of claim 18, wherein when the two gates are in the closed position, there is a space between the two gates so as to avoid obscuring nucleation of the supercooled beverage within the beverage container.

20. The method of claim 12, wherein securing the beverage container comprises securing the beverage container in an upright orientation.

* * * * *